United States Patent Office 3,519,137
Patented July 7, 1970

3,519,137
ROTARY FILTER DRUM FOR CONCENTRATING DILUTED FIBRE SUSPENSIONS
Harry Wilhelm Nilsson, 19 Dammvagen,
S-460 60 Vargon, Sweden
Filed Mar. 25, 1969, Ser. No. 810,305
Claims priority, application Sweden, Apr. 3, 1968,
4,448/68
Int. Cl. B01d 29/06
U.S. Cl. 210—403                    1 Claim

ABSTRACT OF THE DISCLOSURE

A rotary filter drum comprises a rotatable cage which carries a bellows-shaped strainer jacket mounted on triangular plates extending crosswise to the folds of the strainer and in peripheral rows. The cage rotates in partial immersion in a suspension to collect pulp and a stationary funnel is positioned in the cage with an opening above the level of the suspension to receive pulp which is blown from the strainer jacket. In order to retain the collected pulp until it is blown from the strainer jacket, the triangular plates are tilted rearwardly with respect to the direction of rotation of the cage and the edges of the plates are bent forwardly in the direction of rotation to provide a shovel shape for the plates.

---

The invention relates to a rotary filter drum for concentrating diluted fibre suspensions. A filter drum of this type is described in the U.S. Pat. No. 3,278,039 comprises two end walls, a number of parallel rods forming together a cylindrical cage which extends axially between said end walls, a bellows-shaped strainer jacket enclosing the cage between the end walls, substantially triangular plates disposed crosswise to the folds of the strainer and mounted in peripheral rows on the rods, each row of plates being arranged to support one fold of the strainer internally, an inlet for suspension to be filtered through one of the end walls and a funnel mounted stationary within the drum to collect concentrated pulp removed from the inside of the strainer above the liquid level in the drum, said funnel having an outlet extending through one of the end walls.

During operation of the filter drum indicated above, the fibre suspension within the drum is kept at a substantially constant level slightly below the funnel opening which is located in the upper part of the drum. A layer of fibres is deposited on the part of the strainer jacket passing under the liquid surface, and when the strainer passes over the funnel opening, said layer of fibres is removed by pressurized air directed towards the exterior of the strainer by means of nozzles. However, and particularly if the layer of fibres is rather thick, the layer often tends to loosen and fall down from the strainer before reaching the funnel opening. Thereby the concentration of fibres in the suspension in the drum is increased which, in turn, results in a further increase of the thickness of the layer of fibres deposited so that the risk of a premature removal becomes still greater.

The invention has for its object to eliminate this drawback. For that purpose, each supporting plate is inclined rearwardly in the direction of rotation of the drum at an angle of about 20–40° in relation to the axial plane extending through the base edge of the plate. Further, the edges of the plate facing the open sides of the fold of the strainer are bent forwardly in the direction of rotation so that the plate forms a shovel, whereby concentrated pulp deposited on the strainer is retained thereon up to a point above the inlet of the funnel.

Figure 1:
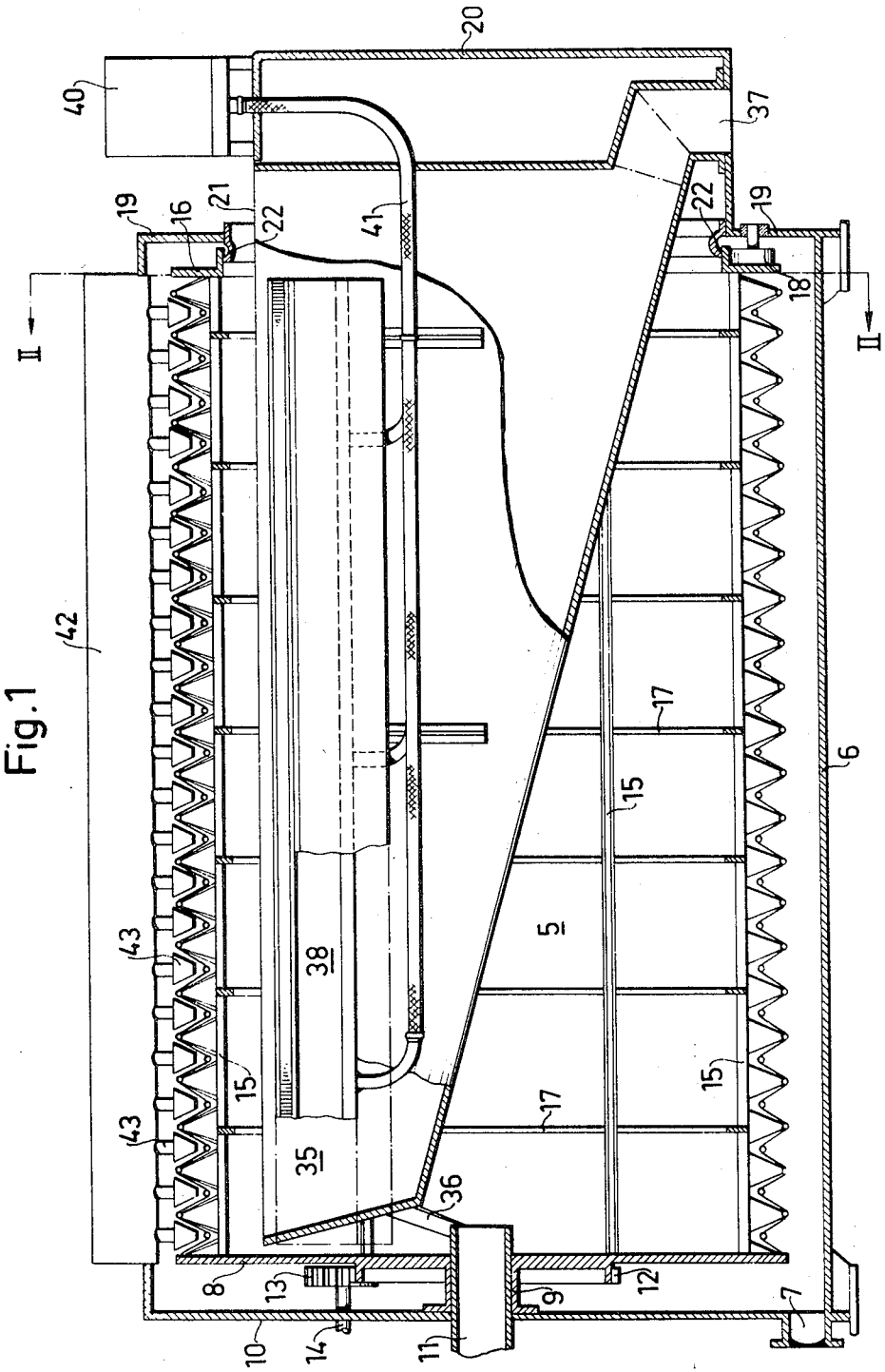
Figure 2:
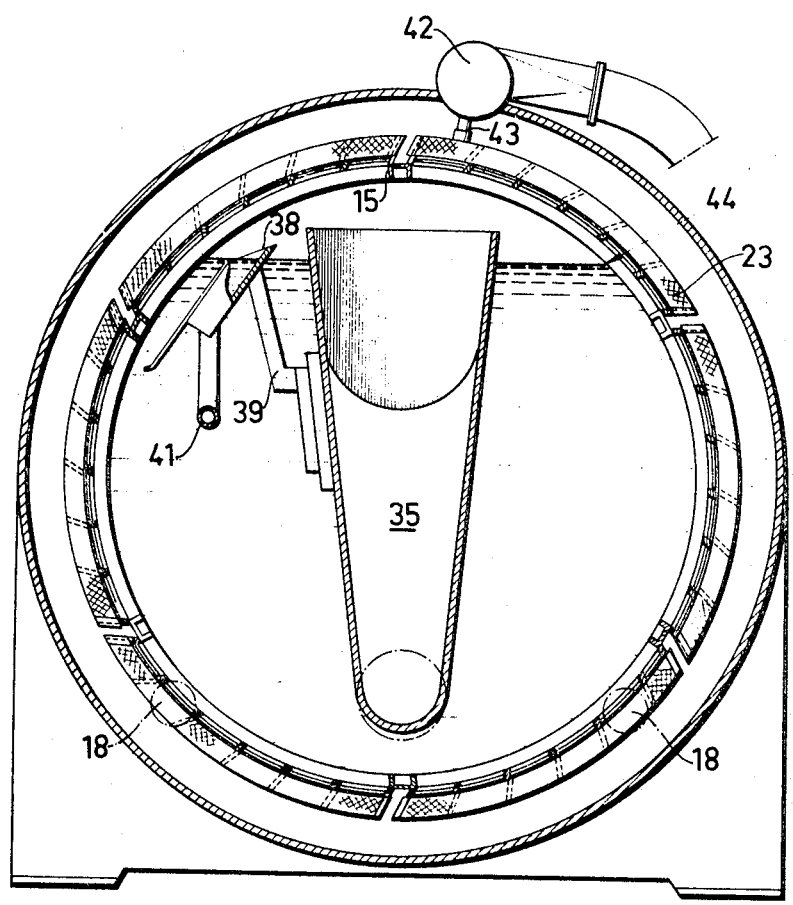
Figure 3:
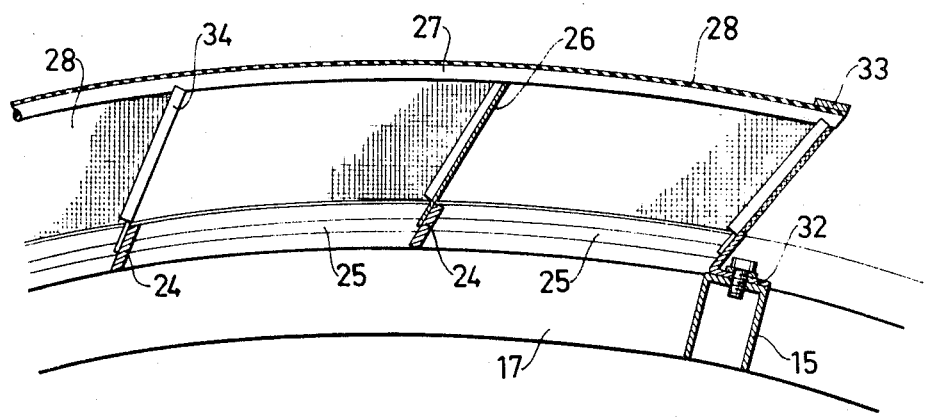
Figure 4:
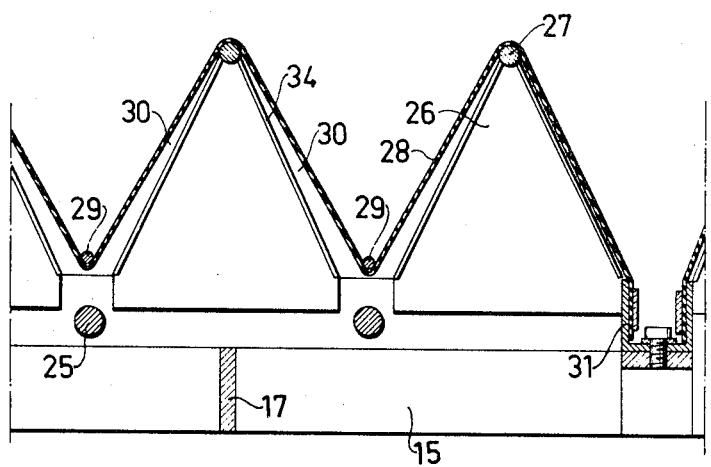

The invention will be described in more detail with reference to the accompanying drawings, in which FIGS. 1 and 2 show a vertical longitudinal section and a cross section, respectively, through a drum filter;

FIG. 3 shows, on a larger scale, a cross section through a short portion of the actual drum; and FIG. 4 shows, likewise on a larger scale, a longitudinal section through a portion of the drum.

In FIGS. 1 and 2, a horizontal filter drum 5 is rotatably mounted in a vat 6 having an outlet 7 near the bottom. One end of the drum is formed by a circular solid end wall 8 which has a central hub portion 9 rotatably journalled on an inlet pipe 11 in an adjacent wall 10 of the vat. A gear rim 12 secured to the outside of the end wall 8 coaxially to the hub 9 meshes with a gear 13 on a shaft 14, which is journalled in the wall 10 and connected to driving means, not shown.

A number of parallel rods 15 U-shaped in cross section (FIG. 3) and together forming a cylindrical cage extend from the inside of the wall 8. The opposite ends of the rods 15 are secured to a ring 16 mounted at the other end of the drum and having the same external diameter as the wall 8. Further, cross bars are secured between the rods 15 to form rings 17 spaced axially. The end ring 16 is supported by two rollers 18 journalled in an annular portion 19 of the end wall of the vat. The wall portion 19 surrounds an axially extended wall portion 20 open at the top (at 21) and serving to support a funnel described in the following. A sealing ring 22 is mounted along the inner periphery of the annular wall portion 19 to engage the inner periphery of the end ring 16 of the drum 5 so that the interior of the drum communicates with the extension 20 of the vat but is sealed in relation to the remainder of the vat.

In the embodiment shown, the drum comprises a bellows-shaped strainer jacket composed of a number of separate segments (23 in FIG. 2) arcuate in cross section, whereby repairs are facilitated in the case of damage to the strainer jacket. As appears from FIGS. 3 and 4, each segment 23 has a supporting frame consisting of parallel ribs 24 directed axially and held together by arcuate rods 25 extending peripherally. Each rib 24 carries a row of triangular plates 26 spaced axially and having their apices turned outwardly. Also the plates 26 secured to the ribs 24 are arranged in peripheral rows, and the plates of each such peripheral row carry at their apices an arcuate rod 27, over which a wire cloth 28 is bent to form a fold as seen in FIG. 4. Between two adjacent rods 27, the folds are kept stretched by means of a wire 29 which is stretched between the outermost plates in the row of plates.

As apparent from FIG. 4, wedge-shaped openings 30 are formed between the inside of the wire cloth 28 and adjacent edge portions of the plates 26. The purpose thereof has been described in U.S. Pat. No. 3,278,039. At the ends of the ribs 24, the wire cloth 28 is secured to arcuate angle members 31 (FIG. 4) which are welded to the ends of the ribs in parallel to the rods 25, and thus the whole jacket segment forms a unit. The two outer ribs 24 of the segment 23 are provided with flanges 32 (FIG. 3) bent outwardly to be secured to the U-beams 15 by screws. At the edges of the segment 23 in parallel to the beams 15 the wire cloth is held in sealing engagement with associated plates 26 by means of metal strips 33 folded into the same shape as the wire cloth.

As appears from FIG. 2, where the drum is adapted to rotate counter-clockwise, the plates 26 are inclined rearwardly in relation to the direction of rotation. In the embodiment shown in FIG. 3, each plate 26 forms an angle of about 30° to the drum radius extending through the base of the plate. The edges 34 of the plates extending from the ribs 24 are, moreover, bent forwards in the direction of rotation so that the plates 26 form a type of shovel, the purpose of which will be described below.

A chute-shaped funnel 35 mounted on the projecting wall portion 20 of the vat 6 extends axially into the drum 5 almost to the end wall 8 such that its opening is located slightly below the upper part of the strainer jacket. The inner end of the funnel 35 rests against the stationary inlet pipe 11 by means of a cross bar 36, and from said inner end the bottom wall of the funnel is inclined downwardly onto the wall 20 through which the outlet 37 of the funnel extends. Further, a horizontal trough 38 is in known way mounted within the drum along the part of the strainer jacket which moves downwardly during the rotation. The trough 38 is carried by a bracket 39 secured to the funnel 35 in such position that its opening is situated at the same height as the intended liquid level in the drum.

The end wall 20 of the vat carries a vessel 40 which is filled with a suspension of coarser fibres, and a conduit 41 extending from the bottom of the vessel 40 is divided into a number of branch conduits opening into the bottom of the trough 38. During the operation of the drum, fibre suspension supplied through the conduit 41 and discharged from the trough 38 flows towards the adjacent part of the wire cloth to deposit thereon a filtering layer of coarser fibres.

As usual, a longitudinal tube 42 is mounted above the drum 5. The tube 42 is connected to a source of pressurized air and is provided with nozzles 43 directed towards the strainer jacket to blow air through it so that the layer of fibres deposited on the inside of the strainer is released to fall down into the funnel 35.

As shown in FIG. 2, the liquid level in the drum is adjusted only slightly lower than the opening of the funnel 35 so that the greatest possible portion of the strainer jacket is utilized for filtration. At the point (44 in FIG. 2) where during the rotation of the drum the strainer jacket emerges above the liquid level, the layer of fibres deposited is consequently rather thick and therefore tends to fall off because of its own weight, before the strainer section in question has arrived above the opening of the funnel. This risk is eliminated to a great extent in that the shovel-shaped plates 26 inclined rearwardly retain the layer of fibres until it is released above the funnel opening by means of the jets of air from the nozzles 43. Within each jacket segment 23, the supporting plates 26 may conveniently be disposed at interspaces of 15–20 cm. in the peripheral direction.

What I claim is:

1. A rotary filter drum for concentrating diluted fibre suspensions, comprising two end walls, a plurality of parallel rods extending axially between said end walls and cooperatively forming a cylindrical cage which extends axially between said end walls, a bellows-shaped strainer jacket enclosing the cage between the end walls, substantially triangular plates extending crosswise to the folds of the strainer and mounted in peripheral rows on the rods, each row of plates being arranged to internally support one fold of the strainer, one of the end walls having an inlet for suspension to be filtered, and a stationary funnel mounted within the drum to collect concentrated pulp removed from the inside of the strainer above the liquid level in the drum, said funnel having an outlet extending through one of the end walls, each said triangular supporting plate being inclined rearwardly in the direction of rotation of the drum at an angle of about 20–40° in relation to the axial plane extending through the base edge of said plate, said plate having edges facing the open sides of the fold, said edges being bent forwardly in the direction of rotation so that the plate forms a shovel shape, whereby concentrated pulp deposited on the strainer is retained thereon up to a point above the inlet of the funnel.

References Cited
UNITED STATES PATENTS

| | | | |
|---|---|---|---|
| 917,305 | 4/1909 | Johnson | 210—402 |
| 3,278,039 | 10/1966 | Nilsson | 210—403 |

REUBEN FRIEDMAN, Primary Examiner

T. A. GRANGER, Assistant Examiner